United States Patent

Shiraki et al.

[15] 3,639,700

[45] Feb. 1, 1972

[54] MULTIELEMENT MAGNETIC HEAD OF ALL OXIDE OR SINTERED QUALITIES

[72] Inventors: Takashi Shiraki, Neyagawa; Sadao Masuoka, Hirakata; Minoru Morita, Toyonaka, all of Japan

[73] Assignee: Matsushita Electric Industrial Co., Ltd., Osaka, Japan

[22] Filed: Mar. 16, 1970

[21] Appl. No.: 19,946

[30] Foreign Application Priority Data

Mar. 22, 1969 Japan ..................................44/22487

[52] U.S. Cl. ..............179/100.2 C, 340/174.1 F, 340/74 MC

[51] Int. Cl. ..........................................................G11b 5/14

[58] Field of Search .....................179/100.2 C; 340/174.1 F; 346/74 MC; 29/603

[56] References Cited

UNITED STATES PATENTS

| | | | |
|---|---|---|---|
| 3,390,451 | 7/1968 | Peloschek | 179/100.2 C |
| 3,495,325 | 2/1970 | Bos et al. | 179/100.2 C |
| 2,920,149 | 1/1960 | Koren | 179/100.2 C |

OTHER PUBLICATIONS

Bardell, P. R. Magnetic Materials in the Electrical Industry, 1960, Macdonald & Co. Ltd., London p. 246

*Primary Examiner*—Bernard Konick
*Assistant Examiner*—Jay P. Lucas
*Attorney*—Stevens, Davis, Miller & Mosher

[57] ABSTRACT

A multielement magnetic head for magnetic recording and/or reproducing operations. The tape-engaging face of the head includes magnetic cores each having a gap, preformed sectioned spacers of nonmagnetic material surrounding the magnetic cores, and a shield plate of magnetic material disposed between the adjacent cores. The materials of all the members composing the tape-engaging face are sintered oxides.

4 Claims, 10 Drawing Figures

T. SHIRAKI,
S. MASUOKA
AND M. MORITA
INVENTORS

BY Stevens, Davis, Miller & Mosher
ATTORNEYS

MULTIELEMENT MAGNETIC HEAD OF ALL OXIDE OR SINTERED QUALITIES

This invention relates to a multielement magnetic head.

The magnetic heads now in use are grouped into two types. In one of the two groups, cores are constituted by a block of laminated sheets each formed of permalloy or other material having a high-magnetic permeability, and the cores are securely bonded by resin to a set of two fixing frames. Coils are wound thereon, and subsequently the surface of the lamination providing an effective gap is subjected to lapping process, whereafter the two fixing frames are joined together by resin with a predetermined spacer interposed therebetween to thereby from an effective gap, and assembled into a head.

The magnetic head of this type has the following disadvantages:

1. As the head has many portions jointed by resin the cores and in the gap portion, the face of the head rubbed by a running tape is apt to be deformed with a variation in the ambient temperature at which the head is used, and this in turn leads to an undesirable characteristic of the head.
2. The permalloy or similar soft metal and organic resin forming the tape-engaged face of the head suffer from serious wear and tear resulting from the friction between the tape and that face of the head, and the working life of the head is usually limited to several hundred hours. Additionally, the core material on the opposite sides of the gap tends to be deformed by the contact of the running tape, which often results in a decrease in the output of the head.
3. The resin material present in the exposed face of the head is likely to stick to the organic binder of magnetic powder applied to the tape-engaged face of the head. Therefore, if the tape is played back for a long time, dust and magnetic powder on the tape stick to the portion of the head adjacent to the gap to thereby prevent the intimate contact between the tape and the head to such a degree that no recording or no playback can be effected.
4. The alloy forming the cores has a low specific resistance, which increases a loss resulting from the eddy current within the cores for a high-frequency range and accordingly deteriorates the frequency characteristic of the head.

The magnetic head of the other type now commercially available has its cores formed of ferrite or other sintered magnetic oxide and it has the drawbacks as mentioned below.

1. The high hardness of the material forming the head prevents the precision working of the parts thereof and this places limitations upon the available combination between the cores forming the tape-engaged face and the nonmagnetic material used. To overcome this problem, the prior art magnetic head of this type has its shield area increased with respect to the cores as shown in FIG. 5, in which numerals 3, 4, 6 and 7 denote gaps, cores, shield plates and nonmagnetic sheets respectively, whereas this necessarily requires the casing for holding the head therein to be more complicated in construction. Most often, therefore, the cores and shields are made to have the same width and fixedly encased in a casing formed of aluminum or other nonmagnetic material, as shown in FIG. 6. In this case, however, the equal width of the cores and the shields leads to a relatively great value of crosstalk, and moreover, the nonmagnetic shield casing must be of greater dimensions so as to avoid any extraneous noise.
2. The nonmagnetic material must be processed so as to provide the same abrasion characteristic as the cores.
3. The material forming the cores is fragile enough to allow the core to be fractured by the resin used to join the parts together by bonding or molding, because such resin may enter any clearance formed in the tape-engaged face of the head.

The main object of the present invention is to provide a magnetic head which overcomes these disadvantages and drawbacks and has a long working life as well as an excellent frequency characteristic.

According to the present invention there is provided a multielement magnetic head using ferrite, which comprises a combination of ferrite material for cores and nonmagnetic oxide material to form the tape-engaged face of the head. This construction increases the wear resistivity of the magnetic head and enhances reliability of the movement of the magnetic tape. The casing and the cores are magnetically insulated from each other, whereby the magnetic head can be fixedly mounted within a shield casing of a high-magnetic permeability and thus the entire head assembly can be made compact. Also, the tape-engaged face of the head at the opposite sides thereof in the direction of the movement of the tape is shaped so as to allow the tape to smoothly escape therefrom to thereby improve the contour effect for the low-frequency range.

The invention will now be described in detail with reference to the accompanying drawings, in which:

FIGS. 1*a* to 1*d* are perspective views showing in sequence the manner in which the multielement magnetic head is manufactured according to an embodiment of the present invention;

Figure 4A:
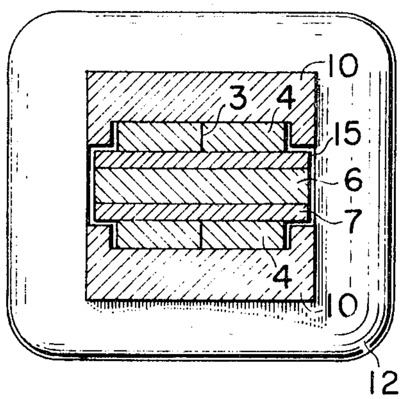
Figure 4B:
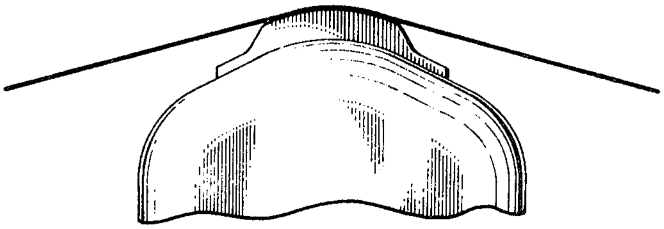
Figure 5:
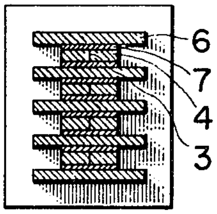
FIG. 5 PRIOR ART
Figure 6:
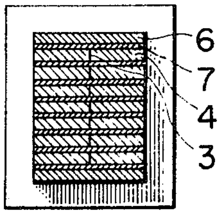
FIG. 6 PRIOR ART

FIG. 4*a* is a sectional view of the magnetic head showing the construction of the tape-engaged face thereof;

FIG 4*b* is a fragmentary side view showing the positional relationship between the running tape and the tape-engaged face of the magnetic head according to the present invention; and FIGS. 5 and 6 are sectional views showing examples of the magnetic head according to the prior art.

Figure 1A:
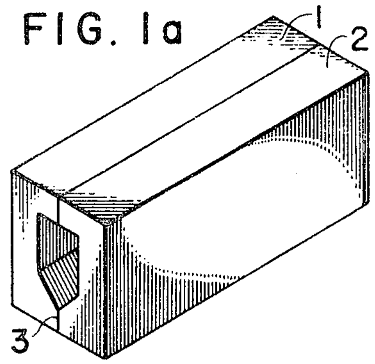

Referring to FIG. 1, a set of two blocks 1 and 2 formed of ferrite or other sintered magnetic oxide and having substantially U-shaped cross section is used to form magnetic cores which provide the main element of the magnetic head assembly according to the present invention. The opposed surfaces of the blocks 1 and 2 are polished and subsequently aligned to each other with a predetermined clearance provided therebetween. The clearance is then filled with wearproof nonmagnetic material such as glass or the like so as to form an effective gap 3.

Figure 1B:
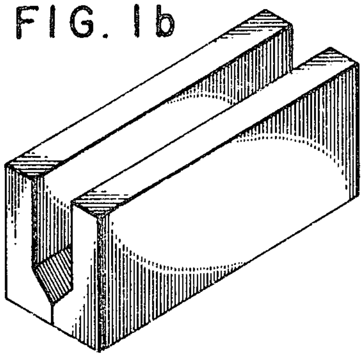
Figures 1C, 1D:
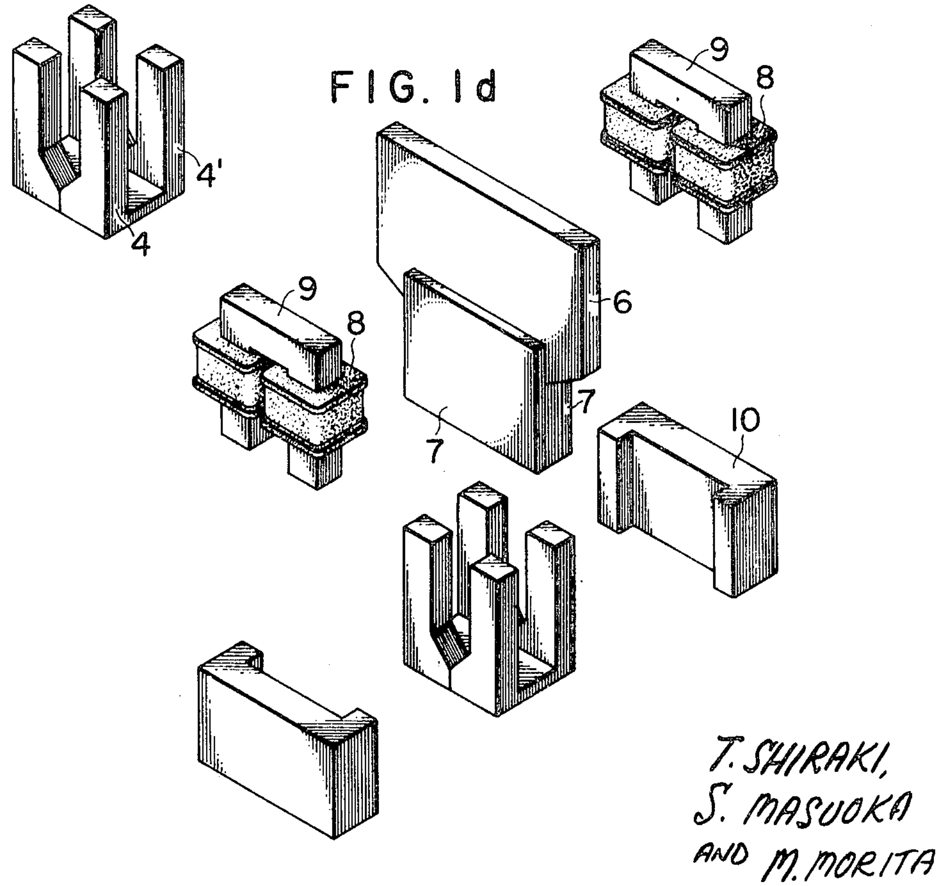

The blocks 1 and 2 thus joined together are subsequently cut away in the rear gap portion thereof as shown in FIG. 1*b*, and further cut into pieces each having a required length for a head, as shown in FIG. 1*c*. Each piece is then formed with a transverse groove so that an effective gap portion is provided on either side of the transverse groove. Thus, there are provided on the opposite sides two sets of portions 4 and 4′ having the same width as that of the core.

Subsequently, as shown in FIG. 1*d*, a shield plate 6 formed of the same magnetic oxide as the core, a pair of sheets 7 formed of sintered nonmagnetic oxide, a pair of yokes 9 each having a coil 8 previously wound thereon, and a pair of fixing frames 10 formed of sintered nonmagnetic oxide are assembled to the core piece so that the core piece is positioned in the center of the assembly.

Figure 2:
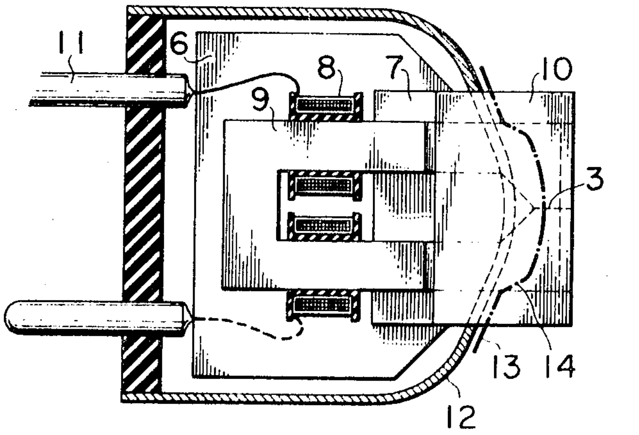
FIG. 2 is a sectional view taken along a plane vertical to the plane of the gap in the magnetic head assembly of FIG. 1.
Figure 3:
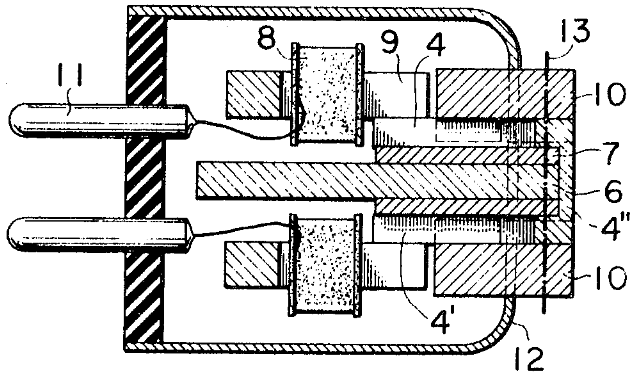
FIG. 3 is a sectional view taken along a plane parallel to the plane of the gap in the magnetic head of FIG. 1.

Referring to FIGS. 2 and 3 which show the construction of the complete magnetic head assembly, the portions 4 and 4′ provide cores each having the effective gap 3 as the juncture. As shown in FIG. 3, the cores 4 and 4′ form a U-shape having an interconnecting end portion 4″. In the groove defined by the cores 4, 4′ and interconnecting end portion 4″, there are disposed the magnetic shield plate 6 and nonmagnetic sheets 7 over the entire width of the groove. THe outer faces of each core are polished like a mirror surface, a portion of which is joined to a portion of that surface of the respective yokes 9 which is also polished like a mirror surface. Thus, the yokes 9 and the cores 4 and 4′ together form two sets of magnetic circuits, which are connected together at the end portion 4″ having a common effective gap 3. The coils 8 wound on the yokes 9 are led out to terminals 11. The entire assembly thus provided is further housed in a casing 12, which is securely fixed to the terminals 11 by means of resin.

With the entire assembly secured in a fixed position, the projecting portion outwardly extended from the casing 12 is cut away as indicated by a dot-and-dash line 13 in FIG. 2, whereby the interconnecting portion 4″ is removed so that the two sets of magnetic circuits provide independent heads having discrete effective gaps 3 respectively.

The outline of the polished tape-engaged face of the head is such that the opposite ends of the core is cut away to provide downwardly sloped surfaces with respect to the tape-engaged face which terminate in lower steps than the level of the tape-engaged face, as shown in FIG. 4*b*. In use, such configuration of the core serves to prevent the malaffect resulting from the sudden disengagement of the running tape from the core face, that is, a kind of resonance effect in the low-frequency range which is called "contour effect." Thus, there is obtained a smooth frequency characteristic of the head.

Also, as shown in the portion of FIG. 4*a* encircled by a dot-and-dash line, a clearance 15 which is unavoidably provided due to the dimensional allowances of various parts is confined in the portion which is not engaged by the tape, so that the resin layer is prevented from being exposed in the tape-engaged face of the head and reliable movement of the tape is ensured.

According to the present invention as described above, the tape-engaged face of the magnetic head comprises magnetic cores each having a gap, nonmagnetic members surrounding the magnetic cores, and a shield plate disposed between the magnetic cores and having a greater width than the magnetic cores. All these parts are formed of sintered oxide material to provide a long-lived head. Moreover, the outer circumference of the cores is surrounded by an nonmagnetic material so that the head assembly can be immediately encased securely in the form of a head casing within a shield casing of permalloy or other material having a high magnetic permeability. This leads to a compact structure which is highly resistive to extraneous noises.

The described construction also reduces crosstalk because the shield has a greater width than the cores. Furthermore, the tape-engaged face having its opposite ends outlined so as to be gradually sloped inwardly acts to reduce the contour effect for long wavelengths, and the unavoidable clearance resulting from the allowances of the parts can be confined in the aforementioned sloped and portion of the head.

A similar effect can also be provided by the fact that the magnetic material forming the cores and shield is ferrite and the nonmagnetic material is ceramics composed mainly of $Fe_2O_3$.

Thus, the materials forming the tape-engaged face of the head are similar in composition and mechanical property and this ensures the ready and precise working of the head as well as the smooth surface of the tape-engaged face.

As the nonmagnetic material, use may be made of a sintered oxide composed of $Al_2O_3$, MgO, $S{:}O_2$, $ZrO_2$, BeO, $TiO_2$, etc., to thereby obtain similar results.

In practice, if the cores and shield are formed of ferrite and the nonmagnetic member is formed of ceramics having $Fe_2O_3$ as the main component, and if the assembly is constituted by two head elements, there will be obtained the assembly as shown in FIG. 4, which is a head device for recording and/or reproducing audiostereo signals and having an excellent frequency characteristic, good stereophonic effect and good noise characteristic as well as long-working life. Especially, in two element heads, the construction is very simple and therefore the fabrication is easy.

What is claimed is:

1. A multielement magnetic head including a tape-engaging face, said tape-engaging face comprising magnetic cores each having a gap, yokes each having a coil wound thereon and joined to said cores on the legs thereof, preformed sectioned spacers surrounding said magnetic cores, said spacers of nonmagnetic material and insulating magnetically said magnetic cores for a supporting casing, and a shield plate of magnetic material having a greater width than said cores and disposed between the adjacent cores, the materials forming all of said elements other than said coils being sintered oxides.

2. A multielement magnetic head as defined in claim 1, wherein the material forming said cores and said shield plate is ferrite and said nonmagnetic material is ceramics composed mainly of $Fe_2O_3$.

3. A multielement magnetic head as defined in claim 1, wherein the material forming said cores and said shield plate is ferrite and said nonmagnetic material is a sintered oxide composed of $Al_2O_3$, MgO, $SiO_2$, $ZrO_2$, BeO, $TiO_2$.

4. A multielement magnetic head as defined in claim 1, wherein fixing frames are provided to integrally hold said cores and said shield plate with spacers interposed therebetween, said fixing frames being formed of a sintered oxide.

* * * * *